US008121900B1

(12) United States Patent
Gulten et al.

(10) Patent No.: US 8,121,900 B1
(45) Date of Patent: Feb. 21, 2012

(54) FACILITATING REVIEW OF PRODUCTS CONSIDERED FOR PURCHASE

(75) Inventors: Barbara Gulten, Madison, WI (US); Martha G. Michelson, Madison, WI (US); Christopher S. Maddox, Madison, WI (US); Keith M. Davey, Middleton, WI (US)

(73) Assignee: Bop LLC, Madison, WI (US)

( * ) Notice: Subject to any disclaimer, the term of this patent is extended or adjusted under 35 U.S.C. 154(b) by 570 days.

(21) Appl. No.: 12/203,634

(22) Filed: Sep. 3, 2008

Related U.S. Application Data

(60) Provisional application No. 61/061,545, filed on Jun. 13, 2008.

(51) Int. Cl.
*G06Q 30/00* (2006.01)
(52) U.S. Cl. .............................. 705/26; 705/27; 715/200
(58) Field of Classification Search ........................ None
See application file for complete search history.

(56) References Cited

U.S. PATENT DOCUMENTS

| | | | |
|---|---|---|---|
| 6,175,864 B1 * | 1/2001 | Addison et al. | 709/219 |
| 6,669,195 B1 * | 12/2003 | Gordon | 273/121 B |
| 7,346,858 B1 * | 3/2008 | Berg et al. | 715/853 |
| 2007/0271149 A1 * | 11/2007 | Siegel et al. | 705/26 |
| 2008/0040341 A1 * | 2/2008 | York et al. | 707/5 |
| 2009/0043674 A1 * | 2/2009 | Minsky et al. | 705/27 |

OTHER PUBLICATIONS

Score American Soccer: Virtual Dressing Room (http://www.scoresports.com/cdr.php), 2007-2008, 2 pages.
Knicker Picker: The online dressing room (http://www.knickerpicker.com/dressing-room.asp?results=27&Type=Brand&BNm=La%20Senza), Jan. 2008, 1 page.
My Virtual Model—Virtual Dressing Room (http://www.mvm.com/en/solutions.htm), Jan. 2006, 4 pages.
Dressing Room Dogma London Inc. (http://www.dogmalondon.com/dressing.html), Jan. 2006, 2 pages.
H&M Virtual Dressing Room, published on the Internet (website address unknown), Dec. 4, 2007, 2 pages.

* cited by examiner

*Primary Examiner* — Luna Champagne
(74) *Attorney, Agent, or Firm* — Thomas, Kayden, Horstemeyer & Risley LLP

(57) ABSTRACT

Disclosed are various embodiments for facilitating review of products considered for purchase. An electronic commerce application generates a plurality of network pages in a server that are served up to a client to facilitate a purchase of at least one product. At least a subset of the network pages are configured to display a plurality of images of a corresponding plurality of products. The network pages facilitate a selection of at least one of products depicted in the images to be considered for purchase. A region that persists throughout at least the subset of the network pages is employed to display a collection of at least one image corresponding to at least one selected one of the products.

36 Claims, 14 Drawing Sheets

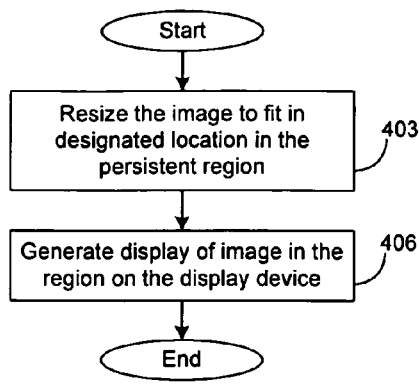
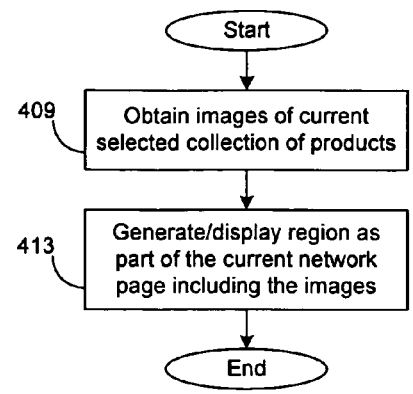
FIG. 13
FIG. 14
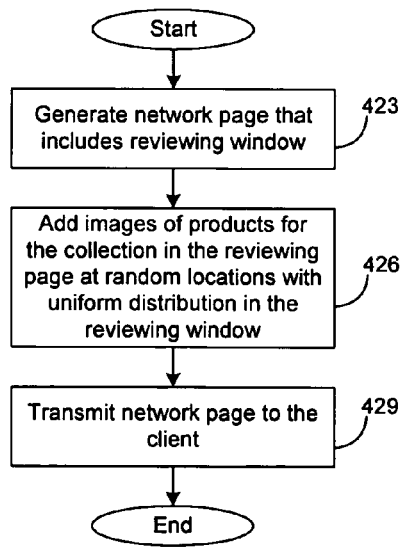
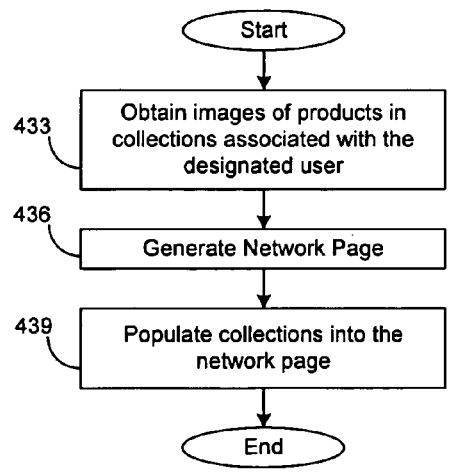
FIG. 15
FIG. 16

FACILITATING REVIEW OF PRODUCTS CONSIDERED FOR PURCHASE

CROSS REFERENCE TO RELATED APPLICATIONS

This Patent Application claims priority to U.S. Provisional Patent Application No. 61/061,545 filed on Jun. 13, 2008 entitled "FACILITATING REVIEW OF PRODUCTS CONSIDERED FOR PURCHASE," which is incorporated herein by reference in its entirety.

BACKGROUND

More and more people have begun to shop for products online over the Internet. Unfortunately, the typical online shopping experience can make it difficult to review products selected to be purchased during the selection process.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 13 is a flow chart illustrating one example of functionality implemented in the client of FIG. 1 according to an embodiment of the present disclosure;

FIG. 14 is a flow chart illustrating another example of functionality implemented in the client of FIG. 1 according to an embodiment of the present disclosure;

FIG. 15 is a flow chart illustrating an example of functionality implemented in the server of FIG. 1 according to an embodiment of the present disclosure;

FIG. 16 is a flow chart illustrating another example of functionality implemented in the server of FIG. 1 according to an embodiment of the present disclosure;

DETAILED DESCRIPTION

Figure 1:
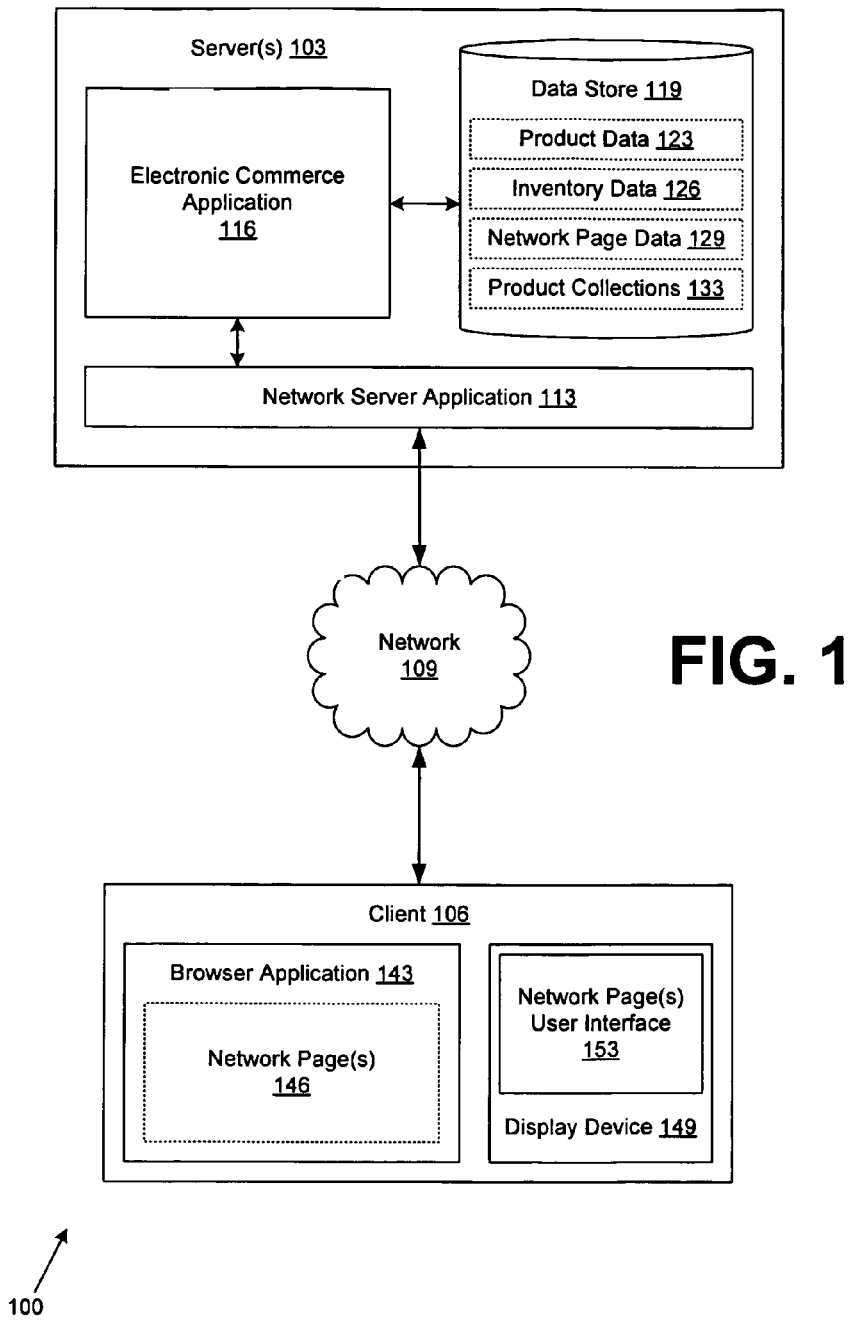
FIG. 1 is a drawing of a data communications network having a server and a client according to an embodiment of the present disclosure.

With reference to FIG. 1, shown is a data communications network 100 that includes one or more servers 103 and one or more clients 106, both of which are coupled to a network 109. To this end, the server 103 may comprise a bank of servers or other arrangement as can be appreciated. The client 106 is representative of what may be many different clients that can communicate with the server over the network 109. The network may comprise, for example, the Internet, intranets, wide area networks (WANs), local area networks, wireless networks, or other suitable networks, etc., or any combination of two or more such networks.

According to various embodiments, the server 103 is employed to implement the functions of an online merchant. The client 106 is controlled by customers who make purchases from the online merchant. To this end, the client 106 interacts with the server to accomplish purchases of products as will be described. In order to accomplish the functions of the online merchant, the server 103 serves up various network pages to the client 106. The client 106 ultimately renders various user interfaces that facilitate customer selection of products. The user interfaces also facilitate review by customers of various selections made before purchase as will be described.

The one or more servers 103 include various applications such as, for example, network server applications 113 and an electronic commerce application 116. The network server application 113 is executed in order to receive requests from clients 106 and cause the electronic commerce application 116 to generate a response. In this respect, the network server application 113 acts as the portal through which requests are received and through which responses are sent to clients 106. To this end, the network server application 113 may comprise, for example, a web server or other type of server application as can be appreciated.

The electronic commerce application 116 is executed, for example, in order to facilitate the online purchase of products over the network 109. To this end, the electronic commerce application 116 performs various back end functions associated with the online presence of a merchant in order to facilitate the online purchase of products. For example, the electronic commerce application 116 may generate network pages such as web pages or other types of network content that are provided to a client 106. The network pages may be static in nature, or they may be generated dynamically. Such network pages may be generated dynamically using various software platforms such as AJAX, PERL, JAVA, or other software platforms that are generally referred to as Web 2.0 as can be appreciated. According to various embodiments, the network pages may include dynamic content or applications that facilitate an interactive experience for users of the client 106.

In performing the various functions involved in electronic commerce, the electronic commerce application 116 may access one or more data stores 119. The one or more data stores 119 facilitate the storage of data associated with the operation of the electronic commerce application 116. To this end, the data store 119 may comprise, for example, a database or other data storage structure as can be appreciated.

The network content that is supplied to a client 106 by the electronic commerce application 116 is provided in response to requests received from the client 106. Such responses may be generated in response to requests that are received in the server 103, for example, as a user of the client 106 navigates through the various pages of a network site associated with the online presence of a merchant. The electronic commerce application 116 may be configured to dynamically generate such network pages using information such as templates and other data in the data store 119 or information obtained from other locations as can be appreciated.

The electronic commerce application 116 may be controlled or operated by a fulfillment entity that implements the fulfillment of orders. In this respect, the fulfillment entity may operate a fulfillment network of material handling facilities such as fulfillment centers, warehouses, and/or other fulfillment structures in order to implement the fulfillment of orders generated by the electronic commerce application 116. Alternatively, the fulfillment entity may interact with third parties in order to implement fulfillment of orders generated by the electronic commerce application 116. Such third parties may operate a fulfillment network to fulfill orders based on requests from the fulfillment entity that controls the electronic commerce application 116.

Stored within the data store 119 are various types of data including product data 123, inventory data 126, network page data 129, and product collections 133. In addition, other types of data may be stored in the data store 119. The product data 123 includes information about a product such as, for example, product descriptions, price, options or parameters associated with products, and other information about products. The inventory data 126 comprises data that describes the quantity of units of a given product that exists within inventory maintained within materials handling facilities such as fulfillment centers, warehouse centers, and other locations operated by a fulfillment entity. The network page data 129 may include various templates, network page applications, and other data that is employed by the electronic commerce application 116 to generate network pages that are served up to the client 106. The product collections 133 comprise listings of products specified by customers manipulating clients 106 as will be described.

The client 106 may comprise, for example, a desktop computer, laptop computer, personal digital assistant, or other device with like capability as can be appreciated. Various applications may be executed on the client 106 such as, for example, a browser application 143. The browser application 143 may be executed to render and execute various network pages 146 generated by the electronic commerce application 116 and served up to the client 106 as will be described. Associated with a client 106 are a display device 149 and possibly other output devices such as printers, speakers, and other devices. According to one embodiment, the browser application 143 may act upon a given network page 146 causing a network page user interface 153 to be rendered on a display device 149 associated with the client 106.

As contemplated herein, the term "products" means any items that may be sold by an online merchant. For example, the products described herein may comprise apparel such as clothing, adornments, accessories, and other items as depicted in the various figures. However, the products depicted are merely examples of the many different types of products that may be viewed and purchased as described herein.

In addition, as described below, a customer may manipulate various graphical components depicted in user interfaces generated by the browser application 143 on a display device 149. One way to manipulate such graphical components is to hover a cursor over an image by using a mouse or other input device and pressing a button on the mouse. Such action is termed herein as "clicking on" a component as can be appreciated. In addition, other approaches may be employed to manipulate various graphical components such as manipulating keyboard buttons or performing other actions as can be appreciated. Where the following description indicates that a user may "click" on a given component, it is understood that such action is but an example of the many different ways that such a graphical component may be manipulated.

Further, one may use a mouse to "drag and drop" a component within a given user interface as described below. In order to do so, one may click on a given item, hold the button down and move the cursor, thereby dragging the item to a new position. The item may be released or "dropped" by releasing the button on the mouse as is typical.

Figure 2:
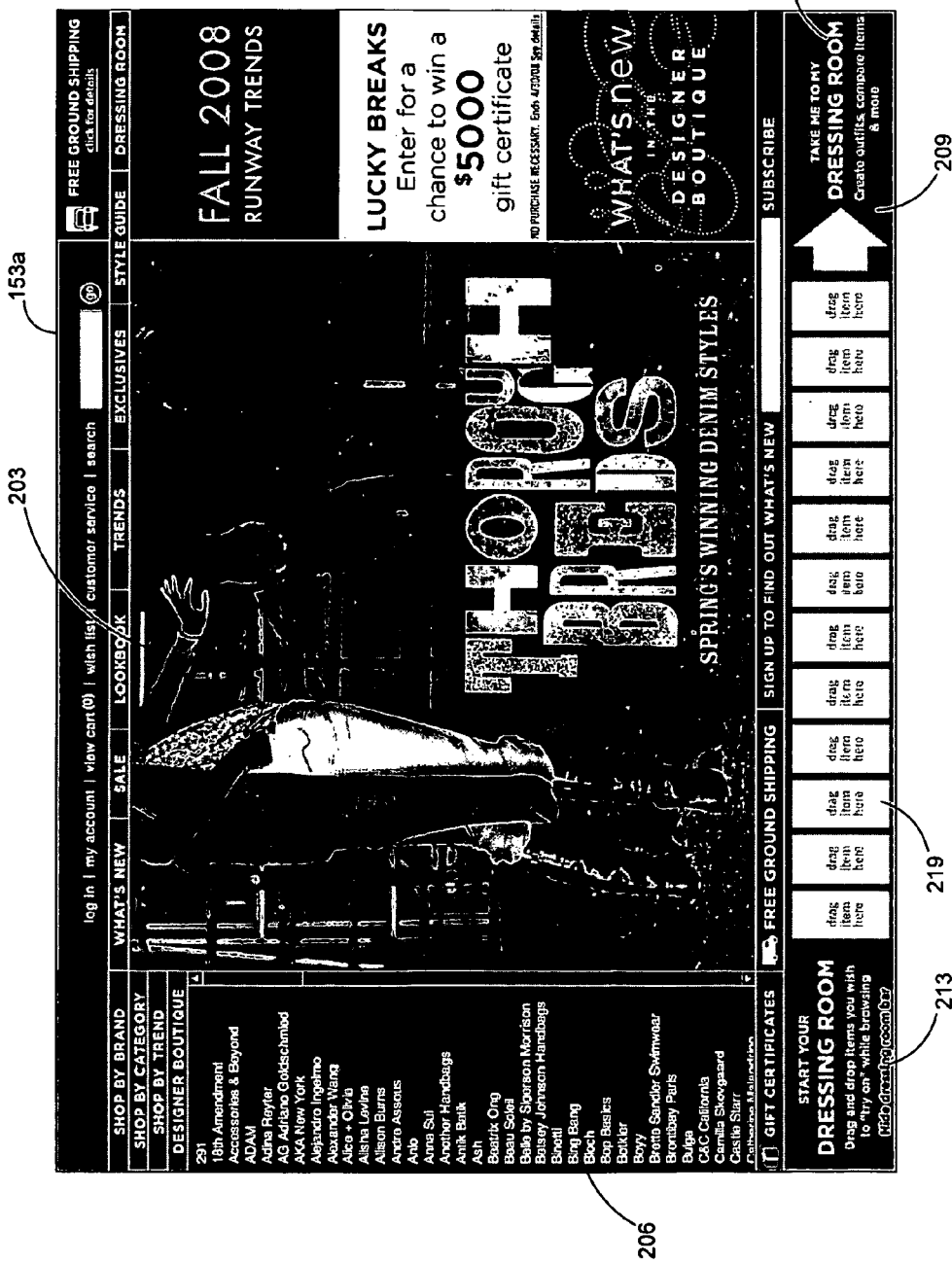
FIG. 2 is a drawing of an example of a first user interface generated on the client of FIG. 1 according to various embodiments of the present disclosure.

With reference to FIG. 2, shown is one example of a network page user interface 153a according to various embodiments of the present disclosure. The network page user interface 153a may be considered as an example of a so called "home page" of an online merchant as can be appreciated. The network page user interface 153a includes various components such as, for example, images 203 that relay various information such as advertisements or commercial offerings, and search related components such as categories 206 that facilitate identifying the particular items one may wish to purchase on a merchant network site such as, for example, a website as can be appreciated.

In addition, a product collection region 209 is disposed at the bottom, for example, of the network page user interface 153a, although the product collection region 209 may be located at any position in the network page user interface 153a. The product collection region 209 allows a user to identify and isolate a collection of products from all of those offered by the online merchant for a closer scrutiny and consideration for purchase. The product collection region 209 may comprise a "bar" that may be collapsed or expanded at the bottom of the network page user interface 153a. To this end, the product collection region 209 includes a collapse actuator 213 that may be manipulated in order to collapse the product collection region 209.

Further, the product collection region 209 includes a reviewing link 216 that may be manipulated by a customer in order to generate a subsequent network page that facilitates a review of all of the images of the products identified in the product collection region 209 as will be described. To this end, the product collection region 209 includes product spaces 219 in which copies of product images that are selected for further review may appear. To this end, according to one embodiment, copies of such product images may be moved to the product spaces 219 by dragging and dropping or via some other input, or otherwise made to appear in the product spaces 219 as will be described.

Figure 3:
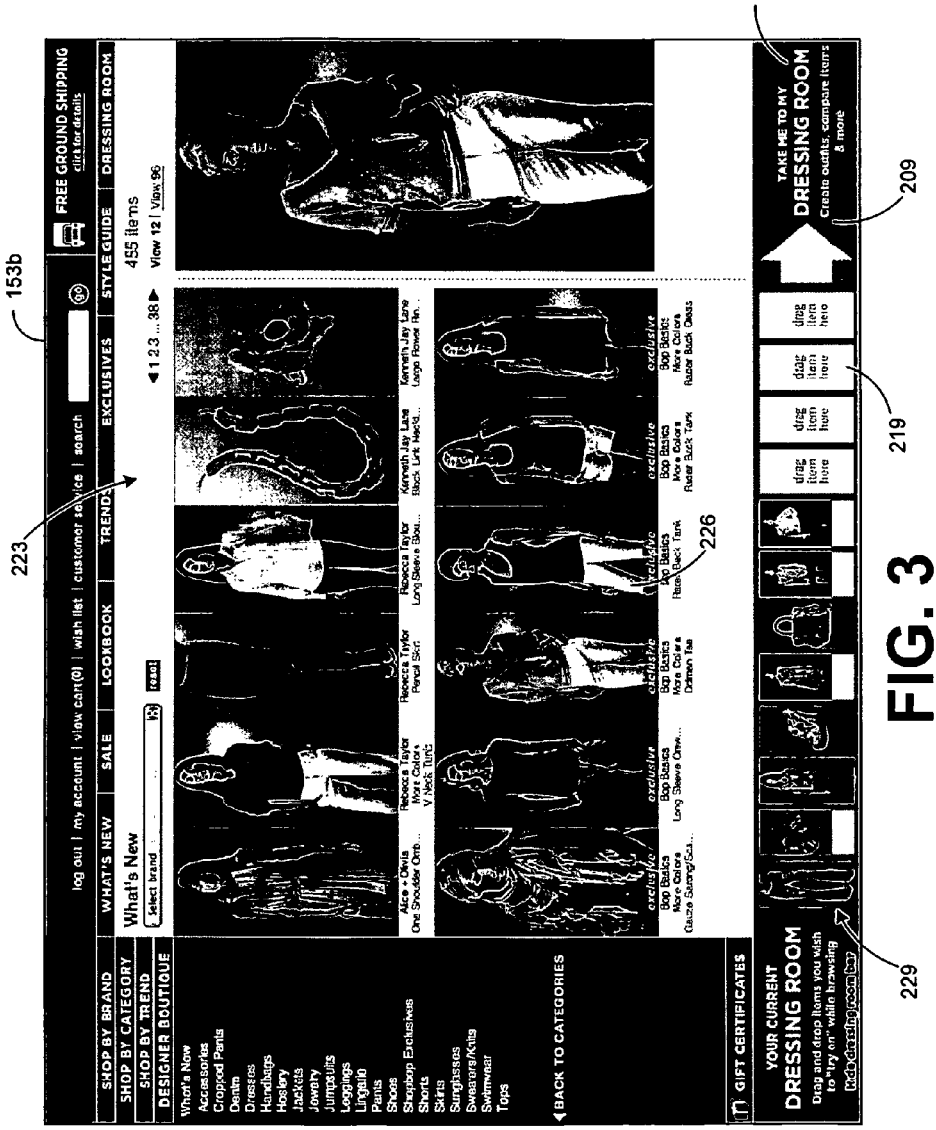
FIG. 3 is a drawing of an example of a second user interface generated on the client of FIG. 1 according to various embodiments of the present disclosure.

With reference next to FIG. 3, shown is a second example of a network page user interface 153b according to an embodiment of the present disclosure. The network page user interface 153b is a part of the network pages generated by the electronic commerce application 116 as described above. The network page user interface 153b may be generated, for example, upon selection of a desired subset of products that a customer wishes to view for a potential purchase. For example, the customer may browse through the various products offered by selecting various categories 206 presented in the network page user interface 153a (FIG. 2). Also, a search for various products may be provided. By manipulating these mechanisms, a user may "drill down" to a select a few products associated with a selected one of the listed categories 206.

The network page user interface 153b shows a product selection 223 that may result due to a search or a selection of various categories 206 (FIG. 2) as described above. The product selection 223 includes product images 226 of the products that are available for purchase through the electronic commerce application 116 as described above. In addition to simply selecting one of the products depicted by a product image 226 for purchase, a user may also select any one of the products represented by the product images 226 to be included in a product collection 229 depicted in the product collection region 209.

In order to select given ones of the products represented by the product images 226, a user may cause a copy of a product image 226 to appear in a respective one of the product spaces 219 of the product collection region 209. To do this, one may move or otherwise copy any one of the images from the product selection 223 to the respective product spaces 219 in the product collection region 209. In one embodiment, this may be accomplished by dragging and dropping a copy of a given product image 226 to one of the product spaces 219. Alternatively, this may be accomplished by manipulating a button or link associated with a given image, or by pressing one or more keys of a keyboard to select a product mage 226 to be placed in one of the product spaces 219. Such product images 226 may be resized so as to fit within the product spaces 219 in association with, for example, the dragging and dropping of a copy of the product images 226. In order to resize such product images 226 and to facilitate the dragging and dropping or other movement of such product images 226 from the product selection 223, various applications may be included within the network page to facilitate such tasks. According to one embodiment, regardless of the size of the product image 226, one will be able to drag and drop or otherwise move such a product image 226 into one of the product spaces 219 to become part of the product collection 229.

According to one embodiment, the dragging and dropping of images in this manner provides an intuitive and convenient approach to including product images 226 in the product collection region 209. However, it is understood that other approaches may be employed in order to select product images 226 associated with respective products to be included in the product collection 229 in the product collection region 209 beyond dragging and dropping as mentioned above as can be appreciated. For example, images may be manipulated so that a selection mechanism appears that causes the product image 226 to appear in the product collection region 209 when manipulated, etc.

Thus, the product collection region 209 provides a distinct advantage in that a collection 229 of products that are of interest to a given customer may be maintained at the bottom of the various network pages generated by the electronic commerce application 116 while the customer browses through the various different products offered by a given merchant. In this sense, the products of the product collection 229 may reflect the personal tastes or style of a given customer. To this end, the products identified in the product collection 229 may advantageously be further reviewed by a customer in order to make an ultimate selection of products for purchase as will be described.

In addition, according to one embodiment, the product collection region 209 is persisted throughout the relevant network pages generated by the electronic commerce application 116. For example, as shown in FIG. 3, the example network page user interface 153b depicts various products. It may be that other network page user interfaces such as the network page user interface 153b depicted in FIG. 3 may be shown with different products in the product selection 223 as a user browses through the various product offerings of a given online merchant. Despite the fact that different network page user interfaces 153b may be generated by the electronic commerce application 116 to be served up to and ultimately rendered on the client 106, the product collection region 209 persists throughout all of such network pages unless a user collapses the product collection region 209 as described above.

It may be the case that the electronic commerce application 116 generates many different network pages in association with the online presence of the merchant. As such, various ones of the network pages may not include the product collection region 209 where it is irrelevant. For example, it may not be desirable to include the product collection region 209 in a network page that facilitates payment for the purchase of one or more products. As such, according to one embodiment, the product collection region 209 persists throughout at least a subset of the total network pages generated by the electronic commerce application 116 and served up to the client 106 in association with the online presence of a merchant. This subset of network pages may comprise, for example, all network pages facilitating the selection of products for purchase or other subset.

Figure 4:
FIG. 4 is a drawing of an example of a third user interface generated on the client of FIG. 1 according to various embodiments of the present disclosure.

Referring next to FIG. 4, shown is one example of a network page user interface 153c generated from a respective network page 146 (FIG. 1) that shows the product collection region 209 (FIG. 3) in a collapsed state. In particular, the network page user interface 153c includes an expand actuator 233 that may be clicked upon by a user in order to cause the product collection region 209 to expand over the advertising content 236 depicted in the network page user interface 153c. To this end, the portion of the network page user interface 153c that includes the expand actuator 233 persists over the pertinent network pages 146 generated by the electronic commerce application 116 (FIG. 1) for which it may be relevant to produce the product collection region 209.

Figure 5:
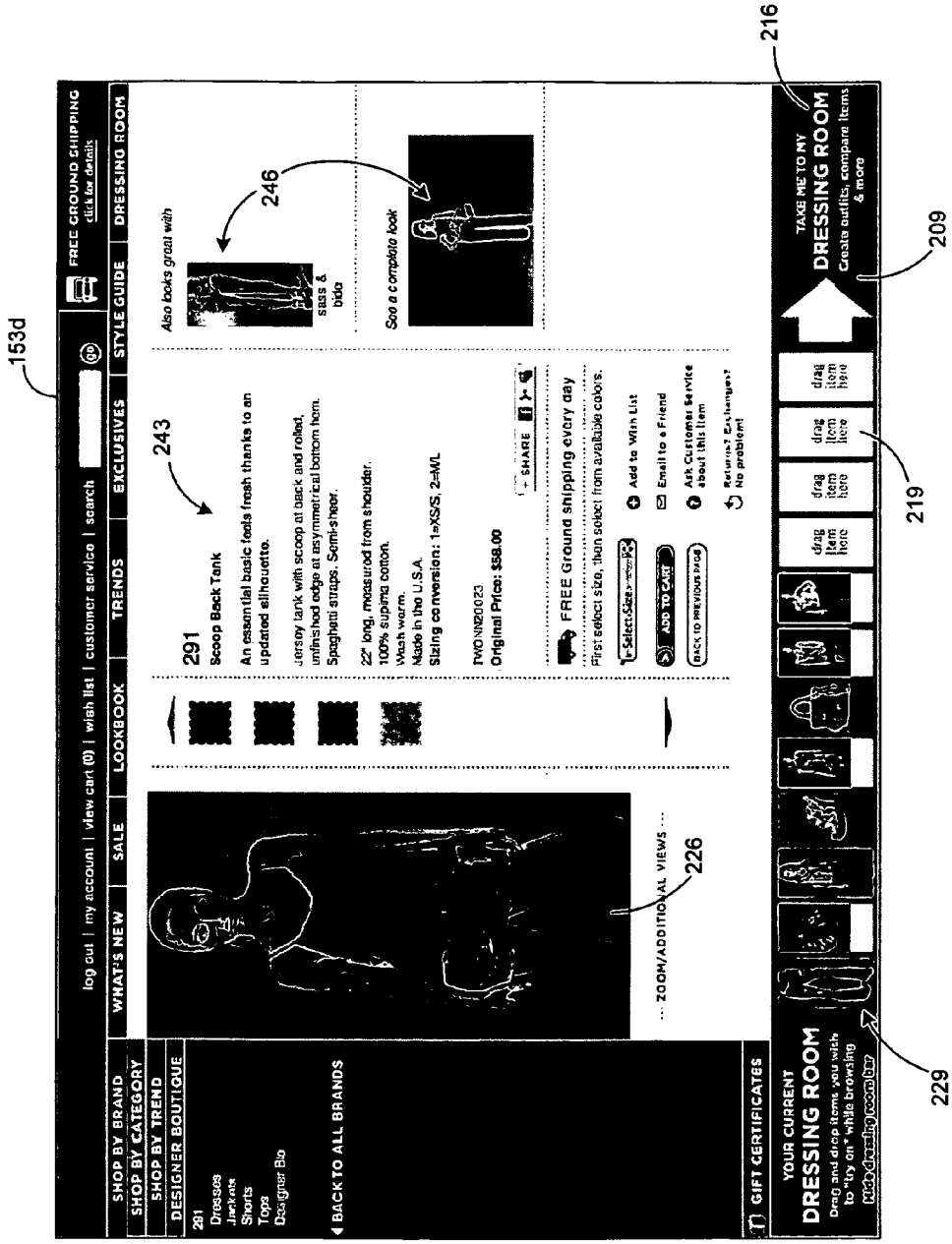
FIG. 5 is a drawing of an example of a fourth user interface generated on the client of FIG. 1 according to various embodiments of the present disclosure.

Referring next to FIG. 5, shown is yet another example of a network page user interface 153d that is generated from a respective network page 146 (FIG. 1) that is generated by the electronic commerce application 116 (FIG. 1) and served up to the client 106 (FIG. 1) according to another embodiment of the present disclosure. The network page user interface 153d depicts more detailed information about a given product depicted in a product image 243 that describes the product depicted in the product image 226. In addition, various product recommendations 246 may also be depicted in the network page user interface 153d.

The product recommendations 246 may be generated by the electronic commerce application 116 using various search algorithms based upon the nature of the product that is depicted in the product image 226. According to one embodiment, a user may drag and drop or otherwise move any one of the product image 226 or the images that depict the product recommendations 246 to a respective one of the product spaces 219 to include such products in the product collection 229. Thus, the product collection region 209 is compatible with any particular view of product images 226 in respective network pages 146.

Figure 6:
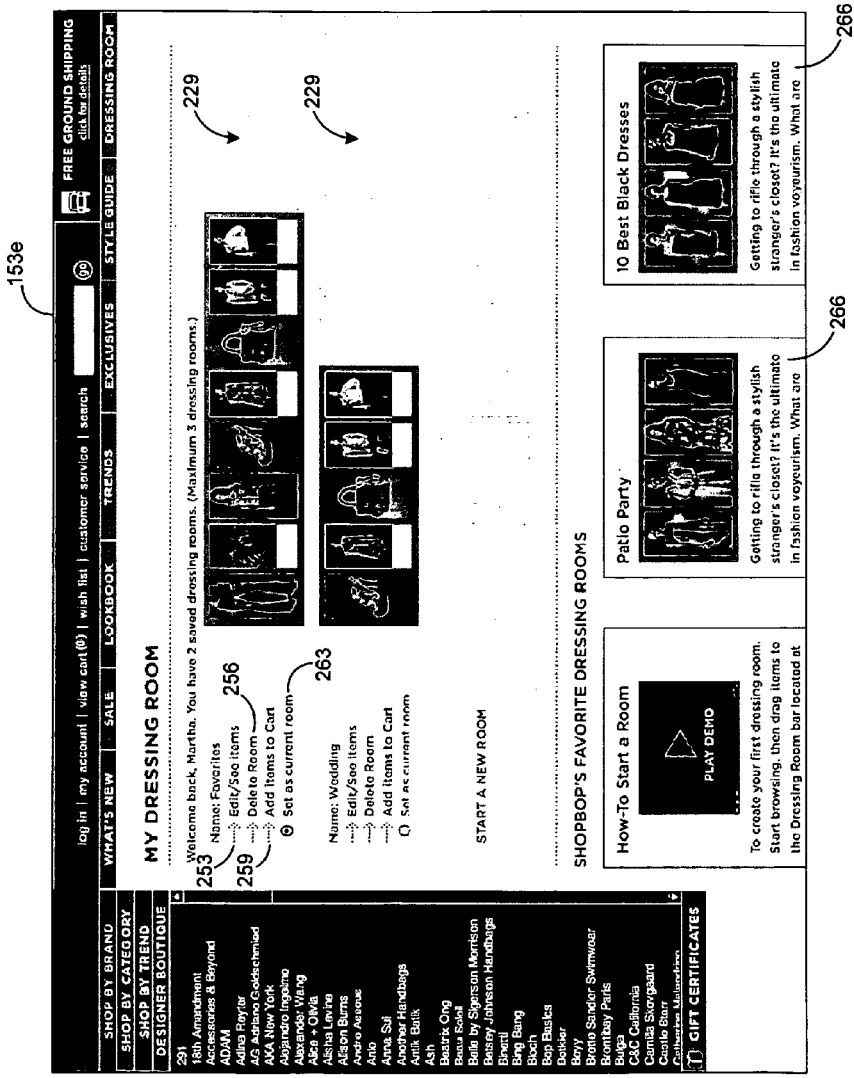
FIG. 6 is a drawing of an example of a fifth user interface generated on the client of FIG. 1 according to various embodiments of the present disclosure.

With reference next to FIGS. 2, 3, and 5, if a customer clicks on the review window link 216, the browser application 143 will send a request to the electronic commerce application 116 for a network page that comprises a product collection landing page in which a plurality of product collections 229 are depicted as shown in FIG. 6. Although a limited number of product collections 229 are depicted, it is understood that an unlimited number of product collections 229 may be depicted by using scrolling techniques, etc.

As shown in FIG. 6, associated with each of the product collections 229 are various actuators including an "edit/see items" actuator 253, a "delete room" actuator 256, an "add items to cart" actuator 259, and a "set as current room" toggle actuator 263. The edit/see items actuator 253 may be manipulated by a customer to generate a subsequent network page that includes a reviewing window that may be used to examine the various products included in the product collection 229 as will be described. The delete room actuator 256 may be manipulated to delete the entire product collection 229. The add items to cart actuator 259 may be manipulated to add each of the products depicted in the product collections 229 to a virtual shopping cart for later purchase by manipulation of subsequent network pages as can be appreciated. The set as current room toggle actuator 263 identifies a respective one of the product collections 229 that automatically appears within the product collection region 209 when it is depicted in a given user interface as described above with respect to FIGS. 2, 3, and 5. Thus, a user may select a given one of the product collections 229 to view when browsing through the various product selections as described above. Also, the selected one of the product collections 229 is depicted in the reviewing window in a subsequent user interface to be described.

In addition, the network page user interface 153e includes predefined product collections 266 that are created for customers and may be viewed separately from the product collections 229. The predefined product collections 266 thus provide guides to customers who may have difficulty identifying the types of products they wish to view in a product collection 229. Also, the predefined product collections 266 provide a shortcut to view specific types of products that may be of interest to a customer.

Figure 7:
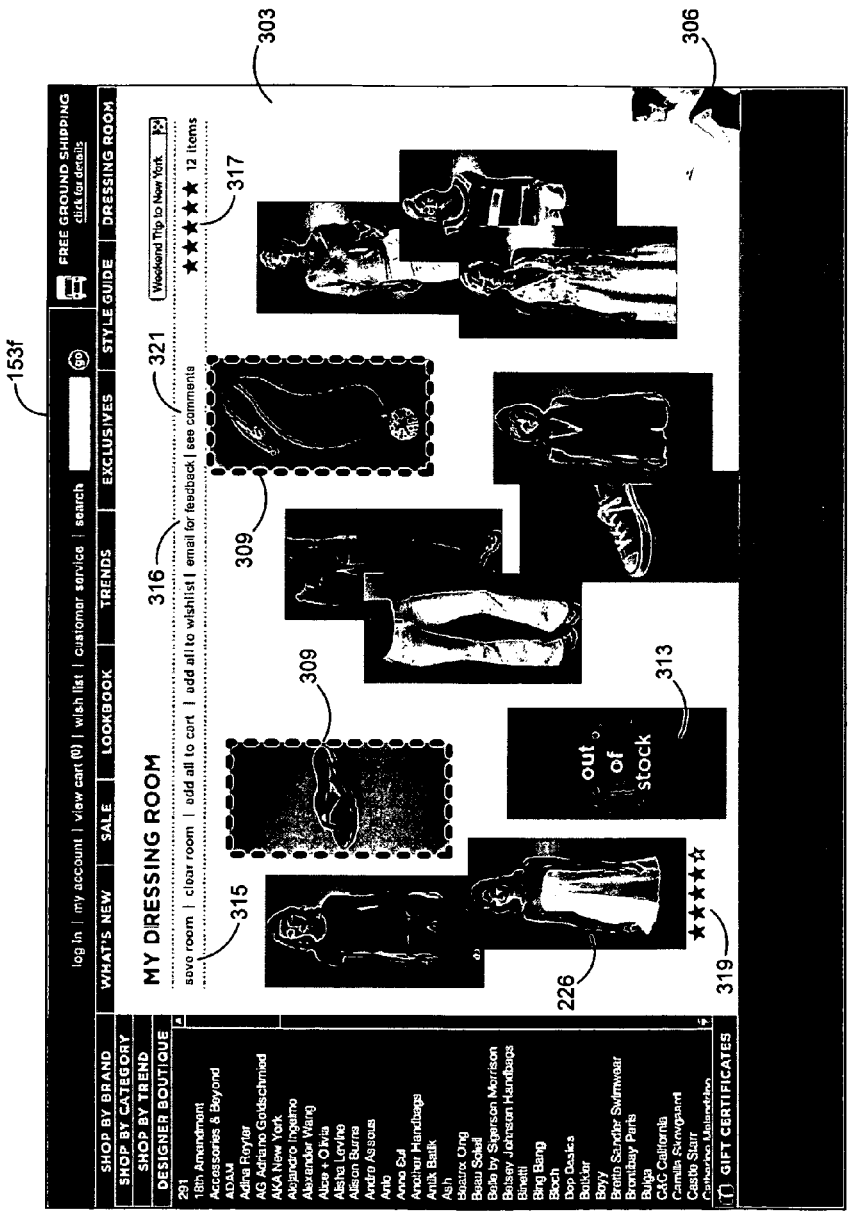
FIG. 7 is a drawing of an example of a sixth user interface generated on the client of FIG. 1 according to various embodiments of the present disclosure.

With reference to FIG. 7, shown is a network page user interface 153f according to various embodiments of the present disclosure. The network page user interface 153f includes a reviewing window 303 that displays the product images 226 that correspond to the selected ones of the products included in the product collection 229. The product images 226 are positioned within the reviewing window 303 so as to appear to have been randomly placed with respect to each other in the reviewing window 303. Stated another way, the positioning of the product images 226 in the reviewing window 303 promotes a perception that the product images 226 were randomly placed with respect to each other in the reviewing window 303. This encourages users to move the images 226 to any location within the reviewing window 303 in order to better view such product images 226 and to compare or contrast such product images 226 with each other. To this end, product images 226 may be moved by dragging and dropping or other approach such as manipulating various keys of a keyboard, etc. Ultimately, this facilitates further consideration of the various products depicted in the product images 226 by customers to determine whether they wish to purchase such products. In this sense, the randomized placement of the product images 226 in the reviewing window 303 encourages customers to experiment or play with the images by moving them around as desired.

The executable logic associated with the network page 146 that generates the network page user interface 153f provides for an ability to move any one of the product images 226 in the reviewing window 303 from a first position to a second position in the reviewing window 303. In this respect, users can compare products depicted in the images 226 with each other. Also, users can put images together so as to be able to approximate different combinations of images of products together. For example, when the products comprise clothing, a customer is able to compare how a given shirt might look with a given pair of pants or a skirt by positioning images relative to each other. In some case, such images may overlap. In this manner, a customer may "assemble" different outfits by approximating a fit between products. For example, a user may place images of products such as clothing items next to each other to see how they might look together in a complete outfit, etc. Similarly, this is the case with products other than clothing. Also, a customer may determine whether various accessories go well with a desired outfit, etc. Thus, the reviewing window 303 facilitates placement of product images 226 next to each other, overlapping each other, or any other position desired by the user.

If a user wishes to remove a given one of the products represented by a product image 226 from the product collection 229, the user may drag and drop or otherwise move the given product image 226 on a virtual attendant 306 at the bottom right hand corner of the reviewing window 303. Once a product image 226 is dropped onto the virtual attendant 306, it disappears from the product collection 229. Alternatively, a product image 226 may be removed from a product collection 229 via some other approach such as through the manipulation of keys in a keyboard, etc. An "undo" feature may be employed to cause a product image 226 to reappear in the product collection 229 after it was removed.

In addition, various indicators may be associated with respective ones of the product images 226 in the reviewing window 303 in order to indicate an availability of such products. For example, a product image 226 may include a "low stock" indicator 309 that indicates that the stock of the particular product depicted in the product image 226 is low and may no longer be available in the near future. Such an indicator 309 may relay the degree to which the stock is running low. For example, where a dashed line is used around the border, the dashes may become shorter as less and less stock is available. Alternatively, an indicator such as a button, or other graphical image component may be associated with a given product image 226 that, when manipulated, reveals the total number of the items available in stock.

Note there may be many other ways to indicate low stock other than the low stock indicators 309 depicted in FIG. 7 or described above. For example, many different types of borders may be employed using different colors. For example, a green color may be employed to indicate sufficient stock whereas a red color may be employed to indicate low or zero stock. Other shades of colors may be employed to indicate the degree of availability depending upon how many items remain in stock. Alternatively, a sliding scale may be associated with respective product images 226 to indicate the same. In the end, there are many different types of ways to indicate whether stock of a given product depicted in a product image 226 is adequate or running low. Ultimately, such low stock indicators 309 provide incentive for customers to make a purchase of the items before they are no longer available when stock is indicated as running low. This increases the pace at which low stock items are sold, for example, thereby liberating space in materials handling centers such as fulfillment centers for new products. Alternatively, the electronic commerce application 116 may be configured to send an email message or other message to a customer associated with a given product collection 229 that a product associated therewith is running out of stock. Various benchmarks may be established with respect to the remaining quantity of stock for respective products as to when such messages are to be sent warning that the stock of such products is getting low.

Further, the reviewing window 303 also may include an "out of stock" indicator 313 that informs a customer that a given product depicted by a product image 226 is no longer available or is out of stock. Such an out of stock indicator 313 may comprise a shading of the entire product image 226 as shown in FIG. 7. Alternatively, there are many other approaches that may be employed to indicate that a product is out of stock in a manner similar to that of indicating a product that is low in stock as described above.

In order to save a product collection 229, a user may manipulate a "save room" link 315 or other component associated with the network page user interface 153f. In response, the product collection 229 is sent to the electronic commerce application 116 and is stored among the product collections 133 (FIG. 1) in the data store 119 (FIG. 1). The electronic commerce application 116 may then consult such data when generating the user interfaces 153e and when generating any network page that includes the product collection region 209 with a selected one of the product collections 229 associated with a customer as can be appreciated. It is understood that in order to store product collections 229 in association with a given customer, the customer may be required to authenticate themselves by providing personal information, for example, while logging into the network site, etc. Alternatively, where a user has not logged in and is anonymous with respect to the electronic commerce application 116, then the user may be directed to the user interface 153e directly from a network page that includes the product collection region 209. As an additional alternative, the product collection 229 may be stored locally in the client 106, for example, using cookies or some other approach. In this respect, the customer would not have to authenticate themselves to the server 103 when they access the network site of the merchant. Rather, information may be taken from cookies stored in the client 106 and the one or more product collections 229 may be obtained from the cookies or other data storage structure on the client 106.

The network page user interface 153f also allows a customer to solicit feedback in the form of a rating or comments from third parties such as friends or relatives. Specifically, a user may cause a message to be sent to a third party by clicking on the "email for feedback" link 316. Although email is shown as one illustration, such a message may take any one of various different messaging formats such as instant messaging, Short Message Service (SMS), facsimile messages, automated telephone messages, or via messages relayed through a network site such as a social networking web site or other web communication. A subsequent network page may be generated by the electronic commerce application 116 that facilitates entry of an email address or other address/identifier of the third party whose feedback is to be elicited. In response to instructions to send the product collection 229 to the third party, the electronic commerce application 116 is configured to generate the message that includes a link to a network page that generates a user interface similar to the user interface 153f.

Such a network page allows the third party to indicate a rating for the product collection 229 depicted therein. Such a rating may be created using various rating mechanisms such as a sliding scale, star rating system, number system (i.e. 1-10), or other system. In one embodiment, the third party creates a rating for the entire product collection 229. In an alternative embodiment, the third party creates a rating for individual products. In such case, a rating mechanism may be presented to the third party for the entire collection or for individual products depicted by product images 226. In this respect, the rating mechanism may be located in a position indicating a rating for the entire collection, or may be located in close proximity to the product images 226 when rating individual images.

Furthermore, various text boxes may be presented to the third party so that they can type in comments about the product collection 229. Once the third party is finished rating the product collection 229, they may click on a submit button or similar device to send the rating results to the electronic commerce application 116. When a customer views the network page 146 that generates the user interface 153f after a rating is received, the customer will see a collection rating 317 for the product collection 229. Alternatively, the customer may see product ratings 319 associated with the respective product images 226 of respective products. Note that the collection rating 317 may be an aggregate or average of the rating of individual products. In addition, a user may click on a "see comments" link 321 in order to view a text box with any comments offered by the third party that generates the rating.

Figure 8:
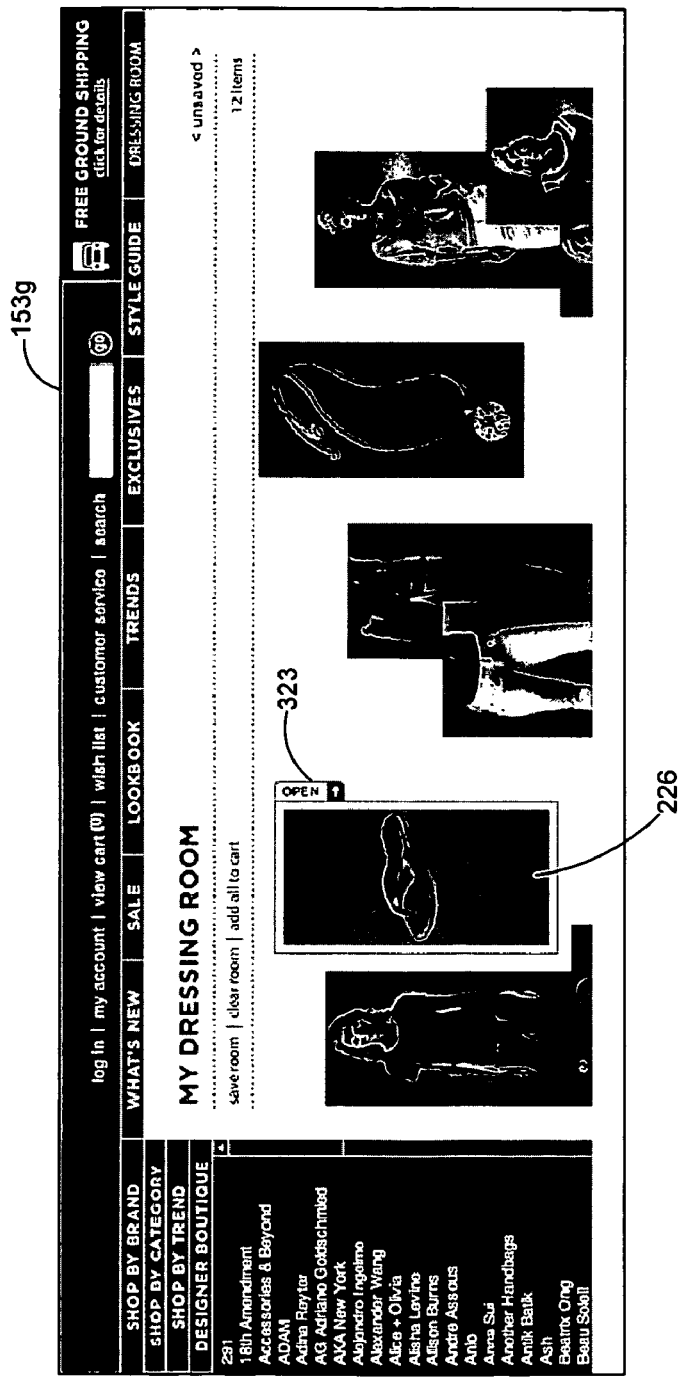
FIG. 8 is a drawing of an example of a seventh user interface generated on the client of FIG. 1 according to various embodiments of the present disclosure.

With reference to FIG. 8, shown is a portion of a network page user interface 153g according to various embodiments. The user interface 153g shows one of the product images 226 with an "open" tab 323 that may be clicked on by a customer in order to obtain further information about the respective product depicted in the product image 226. The open tab 323 may appear, for example, when a cursor is hovered over the product image 226. Alternatively, other approaches may be employed to generate the open tab 323 with respect to any one of the product images 226.

Figure 9:
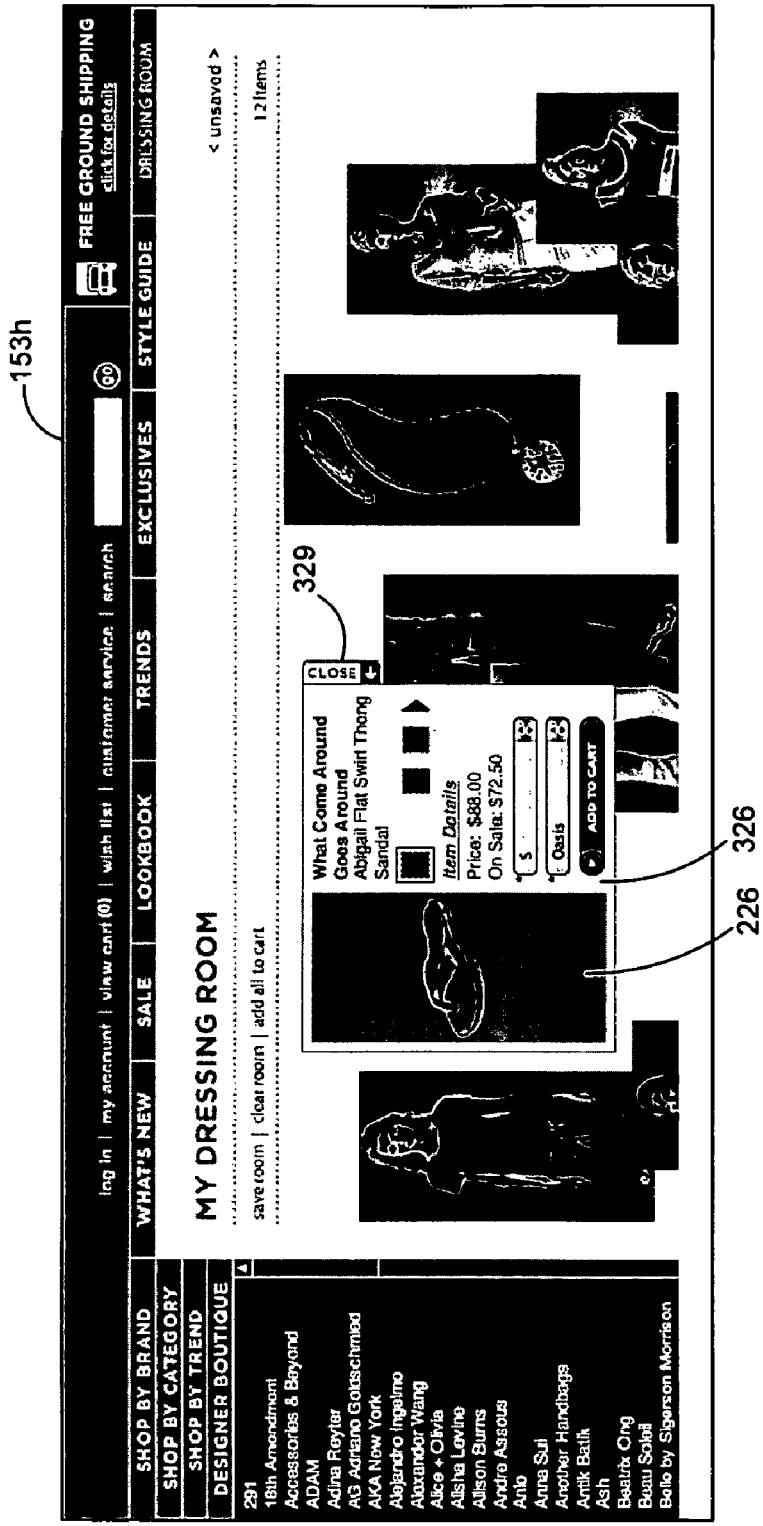
FIG. 9 is a drawing of an example of a eighth user interface generated on the client of FIG. 1 according to various embodiments of the present disclosure.

Turning then to FIG. 9, shown is another example of a network page user interface 153h that further depicts a product specification box 326 that expands from the product image 226 after a user manipulates the open tab 323 (FIG. 8) as described above. The product specification box 326 provides for the specification of various attributes associated with the given product to be purchased by a customer. For example, where the product comprises a clothing item, various product parameters may be specified including a desired color or pattern, a size, and/or other parameters as can be appreciated.

In addition, the product specification box 326 includes a button that may be manipulated to add the specific item to a virtual shopping cart for ultimate purchase as can be appreciated. Further, a close tab 329 is associated with the product specification box 326. A customer may click on the close tab 329 to cause the product specification box 326 to fold back into the product image 226 and disappear. This may occur, for example, when a customer changes their mind as to whether they wish to purchase a product or perhaps did not like the colors associated therewith, etc.

Figure 10:
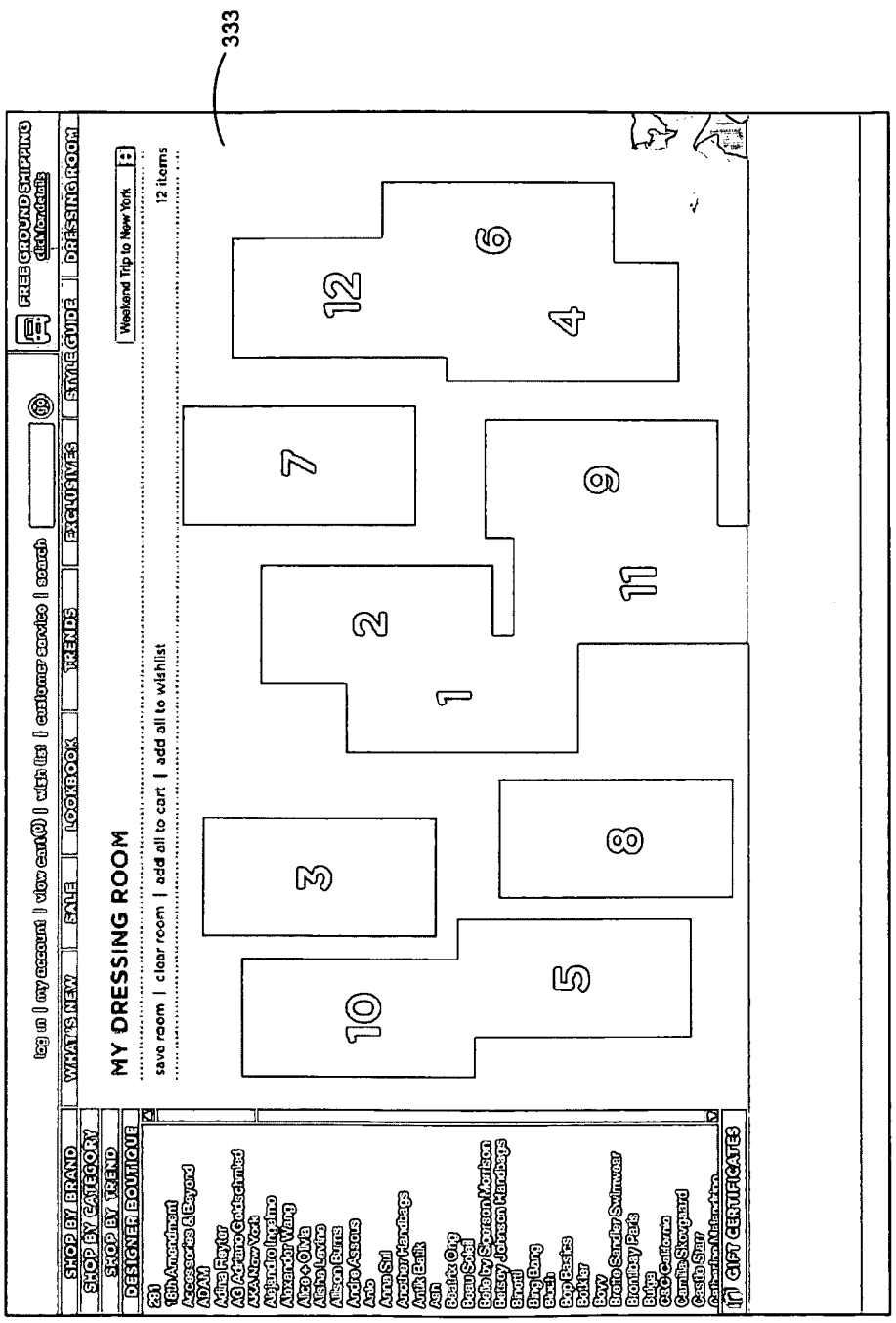
FIG. 10 is a drawing that depicts a scatter pattern used to place images of products in the user interface of FIG. 7 according to various embodiments of the present disclosure.

With reference next to FIG. 10, shown is an example of a scatter pattern 333 that is used for placement of product images 226 into a reviewing window 303 (FIG. 7). The scatter pattern 333 is stored, for example, in the data store 119 as part of the network page data 129 that is employed to generate the network page user interface 153f (FIG. 7). It is possible that many different scatter patterns 333 may be stored in the data store 119, where one of the scatter patterns 333 is randomly selected for the placement of product images 226 into a reviewing window 303 during the creation of a given instance of a reviewing window 303. Alternatively, the product images 226 may simply be randomly placed in the reviewing window 303. In one embodiment, the random placement of product images 226 may be performed with a constraint that ensures that no two images overlap beyond a maximum allowable area of overlap. Alternatively, the centers of the images might be required to be at least minimum distance away from each other or other approach, etc. Such approaches would reduce the probability that a given one of the product images 226 would overlap one or more images too much, or that several of the product images 226 would end up clumped together, etc.

Figure 11:
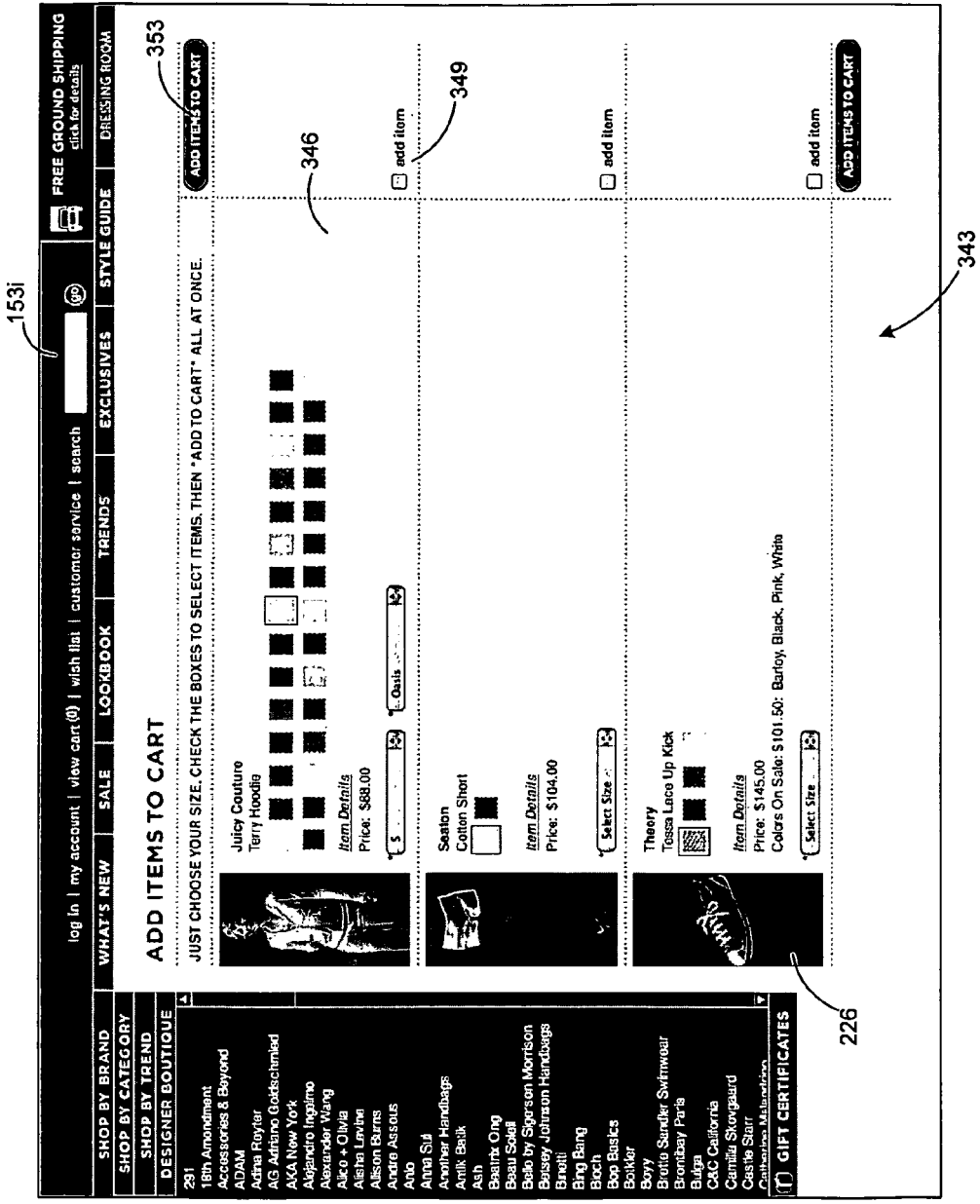
FIG. 11 is a drawing of an example of a ninth user interface generated on the client of FIG. 1 according to various embodiments of the present disclosure.

Referring next to FIG. 11, shown is an example of yet another network page user interface 153*i* that is generated upon a manipulation of an "add all to cart" button or similar component in the network page user interface 153*f* (FIG. 7) that causes each of the products in a product collection 229 to be included in a product specification list 343. In particular, each product image 226 is listed along with a product specification box 346 that facilitates selection of various parameters associated with the given product in a manner similar to that provided by the product specification box 326 (FIG. 9) described above. Associated with each of the product images 226 is an "add item" selector 349 that may be toggled in order to indicate that a given product associated with the product image 226 is to be added to a virtual shopping cart. In order to add each selected product into a virtual shopping cart, the customer may click on or otherwise manipulate an "add items to cart" button 353. Alternatively, other approaches may be employed to add items in a product collection 229 to a virtual shopping cart beyond those described herein.

Figure 12:
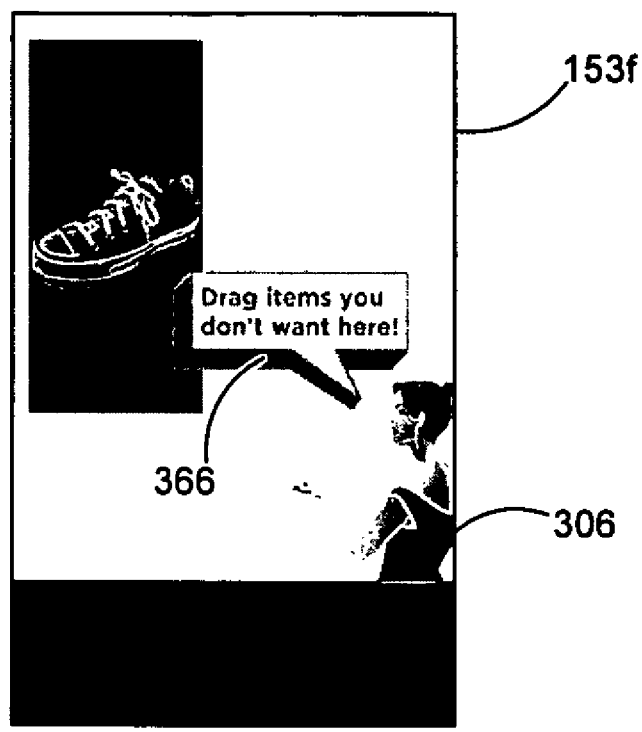
FIG. 12 is a drawing of an example of a tenth user interface generated on the client of FIG. 1 according to various embodiments of the present disclosure.

Referring next to FIG. 12, shown is a portion of the network page user interface 153*f* that depicts the virtual attendant 306. Associated with the virtual attendant 306 is an instructional box 366 that appears at predefined times during viewing of the reviewing window 303 (FIG. 7) by a customer. The instructional box 366 may be generated upon a first viewing of the reviewing window 303 for a predefined period of time. Alternatively, the instructional box 366 may appear when a user is currently dragging or otherwise manipulating any one of the product images 226 within the reviewing window 303. The instructional box 366 indicates to a customer that if they wish to remove a given product image 226 from the reviewing window 303, then they can drop the product image 226 on or near the virtual attendant 306.

Referring next to FIGS. 13, 14, 15, and 16, shown are various flowcharts that depict examples of various functions implemented in the server 103 (FIG. 1) as part of the electronic commerce application 116 (FIG. 1), or in the client 106 (FIG. 1) as an executable portion of one or more network pages 146 (FIG. 1). Alternatively, the flowcharts of FIGS. 13, 14, 15, and 16 may be viewed as depicting steps of various methods implemented in the server 103 or the client 106. It is understood that the flowcharts of FIGS. 13, 14, 15, and 16 are merely examples of functionality in the server 103 or the client 106, and that other functions may be implemented in the server 103 or the client 106 as described herein.

With reference to FIG. 13, shown is a flowchart that depicts some of the functionality associated with a respective network page 146 in facilitating an appearance of a copy of a product image 226 depicted in a product selection view 223 (FIG. 3) in one of the product spaces 219 (FIG. 3). This may be accomplished, for example, by dragging and dropping a copy of product images 226 or otherwise moving a copy of a product image 226 from a product selection view 223 (FIG. 3) or other view to a given one of the product spaces 219 (FIG. 3) when building a product collection 229 (FIG. 3). To begin, in box 403, the network page 146 resizes the image to fit in the designated product space 219 in the product collection region 209. Thereafter, in box 406, the product image 226 is displayed in the product collection region 229 in a respective one of the product spaces 219.

With respect to FIG. 14, shown is a flowchart that depicts the functionality associated with respective network pages 146 (FIG. 1) in generating the product collection region 209 (FIG. 3) as described above. Beginning with box 409, a respective network page 146 will identify product images 226 (FIG. 3) of the currently selected product collection 229 (FIG. 3) as determined by the "set as current room" toggle selector 263 (FIG. 6) that is active for a given one of the product collections 229. Such product images 226 may be locally stored in the client 106, having been downloaded previously from the server 103 (FIG. 1) to the client 106 when displaying the network page user interface 153*e*, for example, or other user interface as can be appreciated.

Alternatively, the network page 146 may request the product images 226 associated with a given product collection 229 from the server 103 as needed. Then, in box 413, the given network page 146 generates the product collection region 209 as part of the current network page user interface 153. The product spaces 219 are populated with the respective product images 226 of the current product collection 229 that has been selected in the user interface 153*e* as described above.

With reference next to FIG. 15, shown is a flowchart that depicts various functionality of the electronic commerce application 116 in generating the network page 146 that results in the display of the network page user interface 153*f* (FIG. 7) that includes the reviewing window 303 (FIG. 7) as described above. First, in box 423, the electronic commerce application 116 generates a skeleton of a network page that includes the reviewing window 303. Thereafter, in box 426, the product images 226 for the designated product collection 229 are added to the reviewing window 303. In doing so, the scatter pattern 333 (FIG. 10) is used as a template to place the product images 226 at random locations in the reviewing window 303. In this manner, the product images 226 are positioned so as to provide for a uniform distribution of the product images 226 throughout the reviewing window 303. This ensures that the product images 226 do not become clumped together in one location, etc. As an alternative, other approaches may be used to randomly place the product images 226 in the reviewing window 303. Thereafter, in box 429, the network page 146 is then transmitted to the client 106 in response to the request by the client 106.

Referring next to FIG. 16, shown is an example of the functionality of the electronic commerce application 116 (FIG. 1) in generating a network page 146 (FIG. 1) that generates the network page user interface 153*e* depicted on the display device 149 (FIG. 1) of the client 106 (FIG. 1) according to an embodiment of the present disclosure. In box 433, the electronic commerce application 116 obtains the product images 226 associated with one or more product collections 229. To this end, the customer may have previously authenticated themselves to the electronic commerce application 116 by performing a login function or may identify themselves in some other manner. In obtaining the product images 226 for the one or more product collections 229 associated with a customer, the electronic commerce application 116 may be configured to look up such product collections 229 associated with the respective customer stored in the data store 119. Thereafter, in box 436, the electronic commerce application 116 generates a skeleton of a network page 146 that generates the network page user interface 153*e*. This may be done, for example, by obtaining appropriate information from the network page data 129, etc. In box 439, the electronic commerce application 116 populates the product collections 229 as represented by the respective product images 226 into the respective network page 146. Thereafter, the network page 146 is then transmitted to the client 106 to be rendered for the customer.

Figure 17:
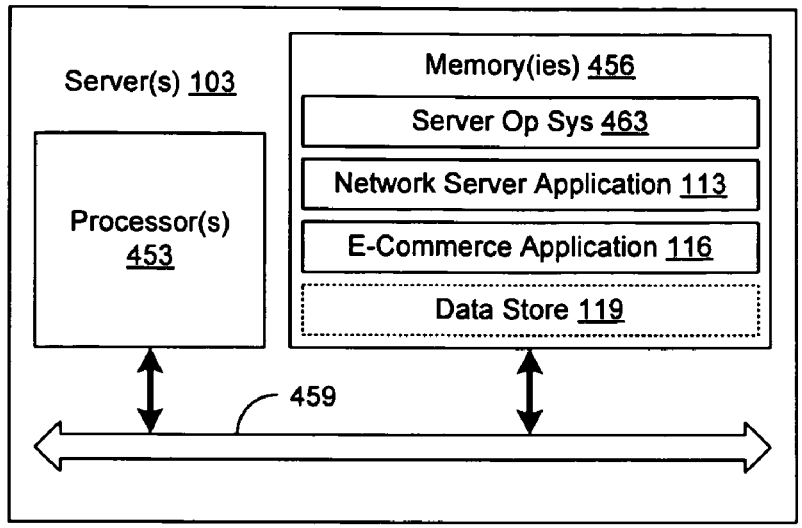
FIG. 17 is a schematic drawing of one example of a server employed in the data communications network of FIG. 1 according to an embodiment of the present disclosure.

Referring next to FIG. 17, shown is a schematic block diagram of one example of a server 103 according to an embodiment of the present disclosure. The server 103 includes a processor circuit, for example, having a processor 453 and a memory 456, both of which are coupled to a local interface 459. To this end, the server 103 may comprise, for example, a server computer with such structure. The local interface 459 may comprise, for example, a data bus with an accompanying address/control bus as can be appreciated.

Stored in the memory 456 are one or more applications that are executable by the processor 453. In particular, such applications stored in the memory 456 include a server operating system 463, the network server application 113, and the electronic commerce application 116. It is understood that there may be other applications that are stored in the memory 456 and are executable by the processor 453 as can be appreciated. In addition, stored in the memory 456 is the data store 119 that includes the product data 123, the inventory data 126, the network page data 129, and the product collections 133 as described above. According to one embodiment, the data store 119 may comprise, for example, a database or other appropriate data structure.

Figure 18:
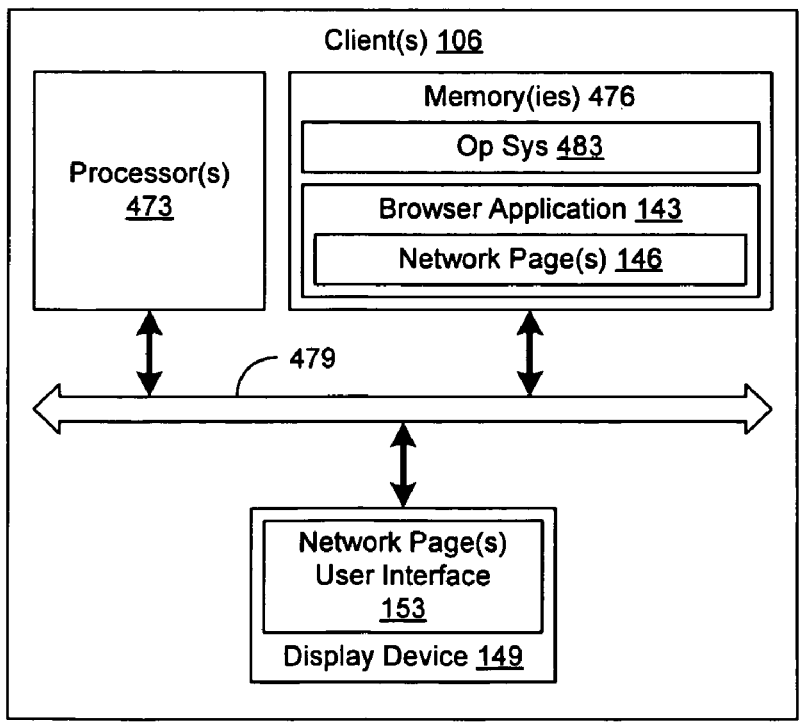
FIG. 18 is a schematic drawing of an example of a client employed in the data communications network of FIG. 1 according to an embodiment of the present disclosure.

Referring next to FIG. 18, shown is one example of a client 106 according to an embodiment of the present disclosure. The client 106 includes a processor circuit that comprises, for example, a processor 473 and a memory 476, both of which are coupled to a local interface 479. To this end, the local interface 479 may comprise, for example, a data bus with an accompanying address/control bus as can be appreciated. To this end, the client 106 may comprise, for example, a computer system such as a desktop computer, a laptop computer, a personal digital assistant, or other device with like capability.

Various applications may be stored in the memory 476 and are executable by the processor 473. Such applications may include, for example, an operating system 483 and the browser application 143. The browser application 143 may be employed to render various network pages 146 (FIG. 1) as described above. To this end, the browser application 143 may cause the execution of executable components in such network pages as described above. In addition, data may be stored in the memory 476 and accessed by the processor 473 during execution of one or more applications as can be appreciated.

A number of software components are stored in the memories 456, 476 and are executable by the respective processors 453, 473. In this respect, the term "executable" means a program file that is in a form that can ultimately be run by the respective processors 453, 473. Examples of executable programs may be, for example, a compiled program that can be translated into machine code in a format that can be loaded into a random access portion of the memories 456, 476 and run by the respective processors 453, 473, or source code that may be expressed in proper format such as object code that is capable of being loaded into a of random access portion of the memories 456, 476 and executed by the respective processors 453, 473, etc. An executable program may be stored in any portion or component of the memories 456, 476 including, for example, random access memory, read-only memory, a hard drive, compact disk (CD), floppy disk, or other memory components.

Each of the memories 456, 476 is defined herein as both volatile and nonvolatile memory and data storage components. Volatile components are those that do not retain data values upon loss of power. Nonvolatile components are those that retain data upon a loss of power. Thus, each of the memories 456, 476 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor circuits represented by the processors 453, 473 and memories 456, 476 may represent parallel processor circuits as can be appreciated.

The operating systems 463, 486 are executed to control the allocation and usage of hardware resources such as the memory, processing time and peripheral devices in the server 103 and client 106, respectively. In this manner, the operating systems 463, 486 serve as the foundation on which applications depend as can be appreciated.

Although the electronic commerce application 116 and the network pages 146 are embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams, user interfaces, and flowcharts of FIGS. 1-18 show the architecture, functionality, and operation of an implementation of the electronic commerce application 116, the various network pages 146, and other applications. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 13-16 show a specific order of execution, it is understood that the order of execution may differ from that which is depicted. For example, the order of execution of two or more blocks may be scrambled relative to the order shown. Also, two or more blocks shown in succession in FIGS. 13-16 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the electronic commerce application 116 and applications associated with the various network pages 146 comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the electronic commerce application 116 and applications associated with the various network pages 146 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
    an electronic commerce application that generates a plurality of network pages in a server that are served up to a client to facilitate a purchase of at least one of a plurality of products;
    at least a subset of the network pages being configured to display a plurality of images of a corresponding plurality of the products, the network pages facilitating a selection of at least one of the products depicted in the images to be considered for purchase;
    a region that persists throughout at least the subset of the network pages, the region displaying a collection of the images of a corresponding plurality of selected ones of the products;
    one of the network pages including a reviewing window that displays the collection of the images of the corresponding selected ones of the products, wherein the reviewing window is separate from the region;
    the images being positioned within the reviewing window so as to appear to be randomly placed with respect to each other;
    a link associated with the region to progress to the one of the network pages that includes the reviewing window;
    wherein the reviewing window facilitates dragging the images to any position within the reviewing window; and
    at least one graphical component that facilitates specification of a plurality of product configuration options for one of the products depicted by a corresponding one of the images in the reviewing window.

2. The system of claim 1, wherein the one of the network pages is configured to generate the at least one graphical component at a relative position with respect to the one of the images to indicate an association between the at least one graphical component and the one of the images.

3. The system of claim 1, wherein at least the subset of the network pages facilitate the selection of the at least one of the products depicted in the images to be considered for purchase by facilitating a dragging and dropping of a copy of at least one image corresponding to at least one of the products from a display region of one of the network pages into the region.

4. The system of claim 1, wherein the server is configured to store the collection in association with a user.

5. The system of claim 1, wherein the electronic commerce application is configured to transmit a message to a user that an item in a collection associated with the user is almost out of stock.

6. A system, comprising:
    an electronic commerce application that generates a plurality of network pages in a server that are served up to a client to facilitate a purchase of at least one product;
    at least a subset of the network pages being configured to display a plurality of images of a corresponding plurality of products, the network pages facilitating a selection of at least one of the products depicted in the images to be considered for purchase;
    a region that persists throughout at least the subset of the network pages, the region displaying a collection of the images of a corresponding plurality of selected ones of the products;
    one of the network pages including a reviewing window that displays the collection of the images of the corresponding selected ones of the products, wherein the reviewing window is separate from the region; and
    the images being positioned within the reviewing window so as to appear to be randomly placed with respect to each other.

7. The system of claim 6, further comprising a link associated with the region to progress to the one of the network pages that includes the reviewing window.

8. The system of claim 6, wherein the reviewing window facilitates moving the images to any position within the reviewing window.

9. The system of claim 6, further comprising at least one graphical component that facilitates adding one of the products depicted by a corresponding one of the images in the reviewing window to a virtual shopping cart.

10. The system of claim 6, further comprising at least one graphical component that facilitates specification of a plurality of product configuration options for one of the products depicted by a corresponding one of the images in the reviewing window.

11. The system of claim 10, wherein the one of the network pages is configured to generate the at least one graphical component at a relative position with respect to the one of the images to indicate an association between the at least one graphical component and the one of the images.

12. The system of claim 6, wherein at least the subset of the network pages facilitate the selection of the at least one of the products depicted in the images to be considered for purchase by facilitating an appearance of a copy of at least one image corresponding to at least one of the products depicted in a display region of one of the network pages in the region.

13. The system of claim 12, wherein at least the subset of the network pages facilitate dragging and dropping the copy of the at least one image into the region.

14. The system of claim 6, wherein the region may be expanded or collapsed as a portion of one the network pages.

15. The system of claim 6, wherein the server is configured to store the collection in association with a user.

16. The system of claim 6, further comprises at least one graphical user interface component presented in the network pages that facilitates providing access to the collection by at least one other user through a corresponding at least one other client.

17. The system of claim 6, wherein the electronic commerce application is configured to transmit a message to a user that an item in the collection associated with the user is almost out of stock.

18. The system of claim 6, wherein the network pages are further configured to facilitate a removal of an image corresponding to one of the products from the collection.

19. The system of claim 6, wherein the network pages are further configured to display a rating associated with the collection, the rating being generated based upon an input received from a third party.

20. A method, comprising the steps of:
receiving a plurality of network pages in a client from a server, the network pages facilitating a purchase of at least one of a plurality of products;
rendering for display in the client a plurality of images depicting corresponding ones of the products in at least a subset of the network pages;
selecting in the client at least one of the products depicted in the images to be considered for purchase;
displaying a collection of the images corresponding to selected ones of the products in the region associated with at least the subset of the network pages that display the images of the products;
persisting the region throughout at least the subset of the network pages;
generating a reviewing window in one of the network pages, the reviewing window displaying the collection of the images corresponding to selected ones of the products, wherein the reviewing window is separate from the region; and
positioning each of the plurality of images in the collection in a corresponding one of a plurality of product spaces in the reviewing window according to a pre-defined scatter pattern so that the images appear to be randomly placed with respect to each other.

21. The method of claim 20, further comprising the step of displaying a rating associated with the collection of the images, the rating being generated based upon an input received from a third party.

22. The method of claim 20, further comprising the step of generating a link in association with the region to progress to a subsequent one of the network pages that includes the reviewing window.

23. The method of claim 20, further comprising the step of moving at least one of the images to a different position within the reviewing window.

24. The method of claim 20, further comprising the step of rendering at least one graphical component as a portion of one of the network pages that facilitates adding one of the products depicted by a corresponding one of the images in the reviewing window to a virtual shopping cart.

25. The method of claim 20, further comprising the step of rendering at least one graphical component as a portion of one of the network pages that facilitates specification of a plurality of product configuration options for one of the products depicted by a corresponding one of the images in the reviewing window.

26. The method of claim 25, further comprising the step of rendering the at least one graphical component at a relative position with respect to the one of the images to indicate an association between the at least one graphical component and the one of the images.

27. The method of claim 20, wherein the selection in the client of at least one of the products depicted in the images to be considered for purchase further comprises the step of facilitating an appearance of a copy of at least one of the images depicted in a display region of one of the network pages in the region.

28. The method of claim 27, wherein the facilitating of the appearance of the copy of the at least one of the images further comprises dragging and dropping the at least one of the images from the display region of one of the network pages into the region.

29. The method of claim 20, further comprising the steps of collapsing and expanding the region.

30. The method of claim 20, sending the collection to the server for storage in association with a user.

31. The method of claim 20, further comprising the step of directing an application in the server to provide access to the collection to at least one other user through a corresponding at least one other client.

32. The method of claim 20, further comprising the step of indicating a product availability in association with the at least one image in the collection displayed in the region.

33. The method of claim 20, further comprising the step of removing an image corresponding to one of the products from the collection.

34. The system of claim 6, wherein each of the plurality of images in the collection is placed in a corresponding one of a plurality of product spaces in the reviewing window according to a pre-defined scatter pattern.

35. The system of claim 34, wherein the product spaces are pre-defined.

36. The system of claim 20, wherein each of the images is positioned in non-overlapping pre-defined product spaces via a scatter pattern.

* * * * *